(12) United States Patent
Li et al.

(10) Patent No.: US 8,504,987 B2
(45) Date of Patent: Aug. 6, 2013

(54) SYSTEM AND METHOD FOR SUPPORTING AN OBJECT ORIENTED SCRIPTING TOOL

(75) Inventors: Haijun Li, Beijing (CN); Xin Xu, Beijing (CN); Peng Sun, Beijing (CN); Vladimir Egorov, Burlingame, CA (US); Hongwei Du, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 12/860,667

(22) Filed: Aug. 20, 2010

(65) Prior Publication Data

US 2012/0023481 A1 Jan. 26, 2012

(30) Foreign Application Priority Data

Jul. 20, 2010 (CN) .......................... 2010 1 0236014

(51) Int. Cl.
*G06F 9/44* (2006.01)
(52) U.S. Cl.
USPC .......................... 717/115; 717/116; 717/165
(58) Field of Classification Search
None
See application file for complete search history.

(56) References Cited

U.S. PATENT DOCUMENTS

| | | | |
|---|---|---|---|
| 7,003,759 B2* | 2/2006 | Jameson | 717/120 |
| 7,136,868 B2* | 11/2006 | Sonkin et al. | 707/754 |
| 7,155,705 B1* | 12/2006 | Hershberg et al. | 717/137 |
| 7,222,333 B1* | 5/2007 | Mor et al. | 717/115 |
| 7,246,134 B1* | 7/2007 | Kitain et al. | 1/1 |
| 7,266,817 B1* | 9/2007 | Barrett | 717/174 |
| 7,389,492 B2* | 6/2008 | Chupa et al. | 717/106 |
| 7,403,934 B2* | 7/2008 | Polizzi | 1/1 |
| 7,512,932 B2* | 3/2009 | Davidov et al. | 717/106 |
| 7,603,658 B2* | 10/2009 | Subramanian et al. | 717/126 |
| 7,725,772 B2* | 5/2010 | Proto | 714/38.14 |
| 7,934,194 B2* | 4/2011 | Kinnucan et al. | 717/109 |
| 8,051,405 B2* | 11/2011 | Komissarchik et al. | 717/115 |
| 2001/0044810 A1* | 11/2001 | Timmons | 707/513 |
| 2003/0163603 A1* | 8/2003 | Fry et al. | 709/328 |
| 2003/0188036 A1* | 10/2003 | Chen et al. | 709/310 |
| 2004/0015840 A1* | 1/2004 | Walker | 717/108 |
| 2004/0045005 A1* | 3/2004 | Karakashian | 719/310 |
| 2005/0114834 A1* | 5/2005 | Richards et al. | 717/114 |
| 2005/0155016 A1* | 7/2005 | Bender | 717/106 |
| 2005/0193291 A1* | 9/2005 | Subramanian et al. | 714/710 |
| 2006/0004827 A1* | 1/2006 | Stuart | 707/102 |
| 2006/0053410 A1* | 3/2006 | Charisius et al. | 717/109 |
| 2006/0112073 A1* | 5/2006 | Jensen et al. | 707/2 |
| 2007/0174814 A1* | 7/2007 | Komissarchik et al. | 717/115 |

(Continued)

OTHER PUBLICATIONS

Mikkel Bundgaard, Troels C. Damgaard, Federico Decara og Jacob W. Winther (2002). Ant Routing System—a routing algorithm based on ant algorithms applied to a simulated network. IT University of Copenhagen—Internet technology. 1-132.*

(Continued)

*Primary Examiner* — Brett Feeney
(74) *Attorney, Agent, or Firm* — Fliesler Meyer LLP

(57) ABSTRACT

An object-oriented scripting tool uses a XML file for software development and domain management. The XML file includes at least a first tag that defines a scripting class in an object-oriented scripting language. The scripting class includes at least one method, which is defined in a second tag in the XML file. A generic software development and domain management script can be encapsulated into a general scripting class, which can be extended into individual scripting class for specific software development and domain management task.

17 Claims, 5 Drawing Sheets

U.S. PATENT DOCUMENTS

| | | | |
|---|---|---|---|
| 2007/0250762 A1* | 10/2007 | Mansfield | 715/501.1 |
| 2007/0256055 A1* | 11/2007 | Herscu | 717/115 |
| 2007/0276689 A1* | 11/2007 | Slone et al. | 705/1 |
| 2008/0082959 A1* | 4/2008 | Fowler | 717/104 |
| 2008/0092109 A1* | 4/2008 | Kinnucan et al. | 717/105 |
| 2008/0098099 A1* | 4/2008 | Khasnis et al. | 709/222 |
| 2008/0109477 A1* | 5/2008 | Lue | 707/102 |
| 2009/0063555 A1* | 3/2009 | Fisher et al. | 707/103 R |
| 2010/0095282 A1* | 4/2010 | Thunemann | 717/137 |
| 2010/0138448 A1* | 6/2010 | Krueger | 707/798 |
| 2010/0299660 A1* | 11/2010 | Torgersen et al. | 717/148 |

OTHER PUBLICATIONS

Boranbayev AS (2009). Defining methodologies for developing J2EE web-based information systems. Nonlinear Analysis. 71 (2009) e1633-e1637.*

Chakravarthy GK and Wainer M (2008). Development of an Ant Script Builder With Thought to Usability and Best Practices. CiteSeerX. 1-7.*

Chirico U (2004). A Java Framework for Ant Colony Systems. Siemens Informatica. 1-11.*

Dinkelaker T and Mezini M (2008). Dynamically Linked Domain-Specific Extensions for Advice Languages. DSAL '08 Proceedings of the 2008 AOSD workshop on Domain-specific aspect languages. 1-7.*

Nicolás Serrano and Ismael Ciordia (2004). Ant: Automating the Process of Building Applications. Open Source. IEEE Software. 89-91.*

Vepa E, Bezivin J, Bruneliere H and Jouault F (2006). Measuring Model Repositories. Proceedings of the 1st Workshop on Model Size Metrics (MSM'06) co-located with MoDELS'2006, 2006. 1-5.*

Zhu SP and Shi J (1994). Graphic User Interface for Transformer Laboratory. IEEE Multimedia Engineering Education. 287-292.*

McGregor JD (2004). Product Production. Journal of Object Technology. 3(10): 89-98.*

Badros GJ (2000). JavaML: A Markup Language for Java Source Code. CiteSeerX. 1-16.*

Bullard D (2010). Presentation. JavaOne: Objected-Oriented Ant Scripts for the Enterprise. 1-76.*

Puder A and Wang L (2005). Cross-Language Functional Testing for Middleware. LNCS. 3502: 56-68.*

Bullard, D., "Object-oriented Ant Scripts for the Enterprise," JavaOne conference 2009—paper TS-4166, Jun. 5, 2009, pp. 1-76, http://www.oracle.com/technetwork/server-storage/ts-4166-159429.pdf.

Diotalevi, F., "Build scripts with Groovy and Ant—Enhance your automated build process with powerful and flexible Groovy scripts," Javaworld—solutions for Java developers, Apr. 10, 2004, pp. 1-4, http://www.javaworld.com/javaworld/jw-10-2004/jw-1004-groovy.html.

Apache Sofware Foundation, Apache Ant 1.5.3 Manual, online, Apr. 9, 2003, pp. 1-42, http://archive.apache.org/dist/ant/source/apache-ant-1.5.3-1-src.zip.

* cited by examiner

| Object Oriented Ant | JAVA |
|---|---|
| 1  `<class name="Hello"> ... </Class>` | `public class Hello {...}` |
| 2 | |
| 3  `<Method name="sayHi">` | `public void sayHi(String message)` |
| 4     `<attribute name="message"/>` | |
| 5  `<Method/>` | |
| 6 | |
| 7  `<Hello.init id="h"/>` | `Hellow h = new Hello();` |
| 8 | |
| 9  `<h.sayHi message="Hi"/>` | `h.sayHi("Hi");` |
| 10 | |
| 11 `<echo message="${h.message}"/>` | `System.out.prinitln(h.getMessage(()));` |
| 12 | |
| 13 `<super.sayHi message="Hi"/>` | `super.sayHi('Hi");` |
| 14 | |
| 15 `<this.sayHi message="Hi"/>` | `this.sayHi('Hi");` |
| 16 | |

Figure 2

```
<MyDomain1.init id="domain1" domainNmae="xxxDomain"/>
<domain1.prepare/>
<domain1.startup/>
```

Figure 6

```
<MyAppl.init id="appl" dir=""/>
<MyApplUtil.init id="applutil"/>
<applutil.process app="appl"/>
```

Figure 7

Domain.class.xml 501 — MyDomainBase.class.xml 502 — MyDomain1.class.xml 503

Figure 5

SYSTEM AND METHOD FOR SUPPORTING AN OBJECT ORIENTED SCRIPTING TOOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority to Chinese Patent Application No. 201010236014.5 entitled "System and Method for Supporting an Object Oriented Scripting Tool," by inventors Haijun Li et al., filed on Jul. 20, 2010, which application is incorporated by reference herein.

FIELD OF INVENTION

The present invention generally relates to a scripting tool for software development and domain management, and particularly to an XML-based scripting tool.

BACKGROUND

A scripting tool is a software tool that is implemented using a high-level scripting language. Typically, the scripts in the scripting tool can be interpreted by the execution environment at run time to perform certain programmed tasks.

One example of such a scripting tool is Ant (or "Another Neat tool"). Ant is a software tool, developed initially for automating software build processes. Ant is implemented using the JAVA programming language. Ant can be used for building JAVA projects in the JAVA platform. A typical Ant script file is in XML file format.

SUMMARY

In accordance with an embodiment, an object-oriented scripting tool uses a XML file for software development and domain management. The XML file includes at least a first tag that defines a scripting class in an object-oriented scripting language. The scripting class includes at least one method, which is defined in a second tag in the XML file. A generic software development and domain management script can be encapsulated into a general scripting class, which can be extended into individual scripting class for specific software development and domain management task.

BRIEF DESCRIPTION OF THE FIGURES

FIG. 2 is an illustration that shows a sample mapping relationship between the syntax in objected oriented Ant scripting language and JAVA programming language, in accordance with an embodiment.

FIG. 5 is an illustration that shows an example of a class hierarchy for managing application server domains, in accordance with an embodiment.

FIG. 6 is an illustration that shows a sample usage of object oriented Ant script classes for managing application server domains, in accordance with an embodiment.

FIG. 7 is an illustration that shows a sample usage of an object oriented Ant utility class, in accordance with an embodiment.

DETAILED DESCRIPTION

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the embodiments of the invention as following uses the JAVA platform as an example for object oriented programming language platform. It will be apparent to those skilled in the art that other types of object oriented programming language platform can be used without limitation.

In accordance with an embodiment, an XML-based scripting tool, such as Ant, can be extended to include object oriented features. In one embodiment, the object oriented scripting tool can be implemented as an extension of the XML-based scripting tool. For example, the object oriented Ant scripting tool, or the object oriented Ant, can be implemented as an extension of Ant, using JAVA programming language. In one embodiment, the JAVA code that implements the object oriented Ant scripting tool can be compiled and deployed in a library directory that is designated by the Ant scripting environment to store extension tasks for the Ant scripting tool.

Figure 1:
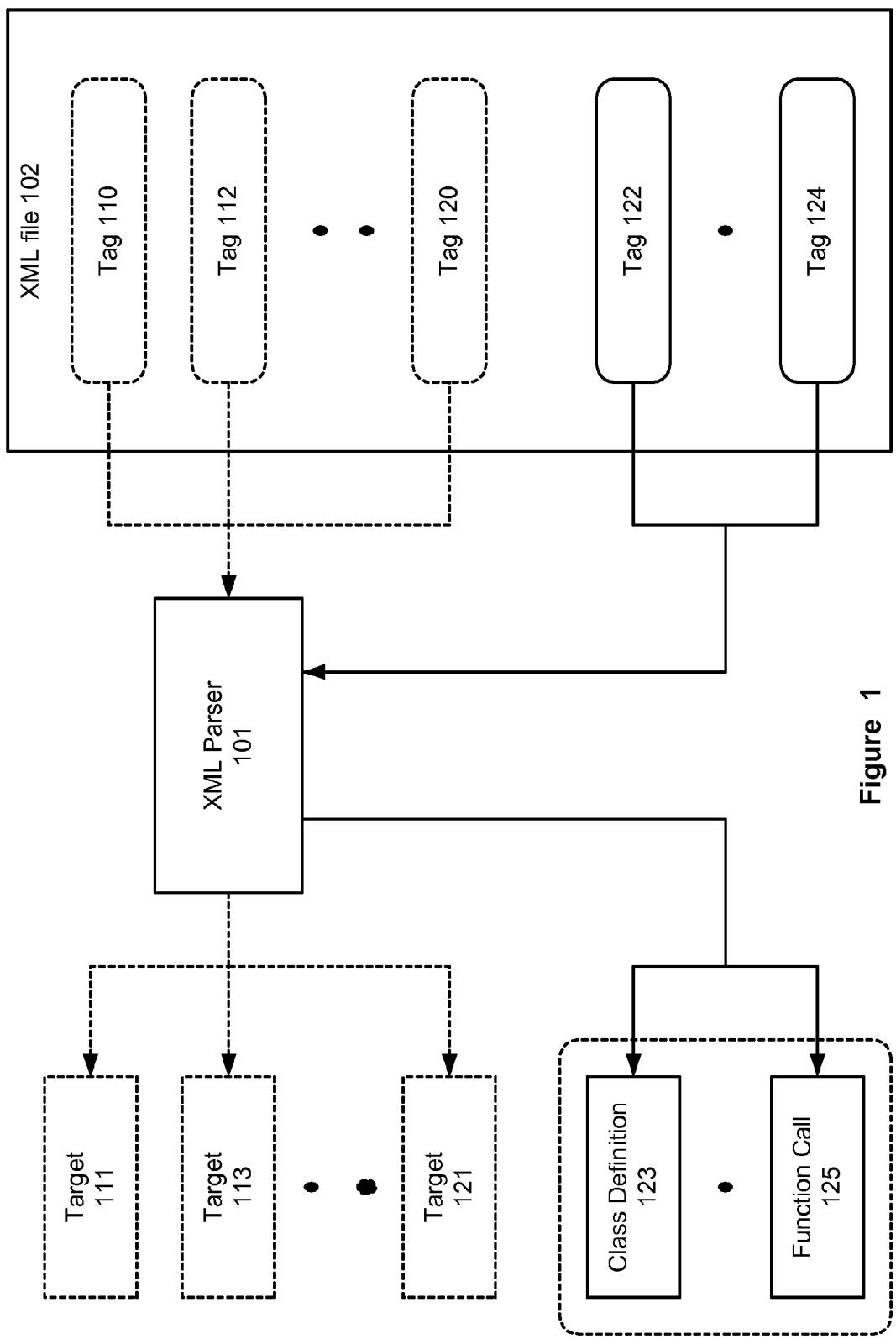
FIG. 1 illustrates an exemplary view of the object oriented Ant scripting tool environment.

FIG. 1 illustrates an exemplary view of the object oriented Ant scripting tool environment.

As shown in FIG. 1, the Ant scripting environment can use an XML parser 101 to parse the scripts that are contained in a XML file 102 with different tags 110, 112, and 120. Each tag 110, 112, or 120 in the XML file 102 is associated with a type of scripting task or target 111, 113, or 121.

In accordance with an embodiment, the object oriented scripting tool, such as the object oriented Ant, can make use of additional tags 122 and 124 that includes object oriented scripting syntax to support the object oriented features. As shown in FIG. 1, a tag 122 can be used to support class definition task 123 in the object oriented Ant scripting environment; and another tag 124 can be used to support function call task 125 in the object oriented Ant scripting environment.

In accordance with an embodiment, the object oriented scripting syntax supports the use of different object oriented scripting types, which can be stored in a type definition table. The type definition table can be implemented using a harsh table, with the tag name as the key for the harsh table. Additionally, each task instance for the object oriented Ant scripting tool can be stored in an instance pool. The instance pool can also be implemented in a harsh table, using the id or reference for each instance as the key.

In another embodiment, such a type definition mechanism can be interpreted as a low priority, to prevent name collision with other usage of the same tag by the software developer for other purposes. In another example, a unique tag can be defined to initiate the object oriented Ant scripting environment, in order to prevent the name collision.

In accordance with an embodiment, the object oriented scripting tool can have similar features that are provided by an object oriented programming language. Furthermore, a software developer who is familiar with the object oriented programming language can easily understand the object oriented scripting language. For example, the objected oriented Ant which is based on Ant scripting language can have similar features as JAVA. This allows skilled JAVA developer to quickly learn to use the objected oriented Ant scripting tool.

FIG. 2 illustrates a sample mapping relationship between the syntax of the objected oriented Ant scripting language and the syntax of the JAVA programming language.

In accordance with one embodiment, the object oriented scripting tool can use a class tag to define a scripting class, just like the JAVA programming language can define a JAVA class. For example, as shown in FIG. 2 at Line 1, a sample "Hello" class is defined in the objected oriented Ant scripting language, which can be mapped to a Hello class in the JAVA programming language.

In accordance with one embodiment, the class tag in object oriented scripting tool can contain arbitrary scripts that encapsulate the behavior of the scripting class. In one embodiment, there can be two attributes for the class tag. One attribute is a name attribute that defines a name for the underlying class. Another attribute is a base attribute that defines the class name of a base class. A default value for the base attribute is "Object," which indicates that the underlying class is a class extended directly from the root class.

In accordance with an embodiment, the object oriented scripting tool can use a method tag to define a method for a class, in a manner similar to defining a method in a JAVA class. In one embodiment, the method tag can have a name attribute. For example, as shown in FIG. 2 at Line 3, the name attribute for the method is given a value "sayHi." Additionally, the method tag also allows one or more attribute tags to be defined in the body of the method tag. Such attribute tags define one or more parameters that can be used by the method when it is invoked. In the example as shown in FIG. 2 at Line 4, the method "sayHi" takes a parameter that specifies the content of a message.

In accordance with an embodiment, the object oriented scripting tool can assign a reference value to a class. For example, in FIG. 2 at Line 7, a tag can be used for class initiation, which is similar to creating a new class in JAVA. The instance of the "Hello" class created using the tag in FIG. 2 at Line 1 is assigned a reference value "h" in order to uniquely identify the instance.

In accordance with an embodiment, the object oriented scripting tool allows a user to use a class invocation tag to invoke a method in a scripting class, in the format of "[class reference].[method name]." For example, as shown in FIG. 2 at Line 9, the "sayHi" method defined in FIG. 2 at Lines 3-5 can be invoked using the syntax of "h.sayHi," which reassembles the class invocation syntax in JAVA. The "sayHi" method is provided with a parameter that that includes the content of the message, accordingly to the definition of the message attribute in FIG. 2 at FIG. 2 at 4.

In accordance with an embodiment, the object oriented scripting tool provides an echo tag that can write out the content of the message. For example, as shown in FIG. 2 at Line 11, the echo tag can operate in a similar manner to System.out in JAVA.

In accordance with an embodiment, the object oriented scripting tool provides an <instance of> tag that can be used to check if some object oriented Ant object is some specific Ant class type. In one embodiment, the <instance of tag provides an "id" attribute which describe an Ant object id; and a "classname" attribute that describes the name of an Ant class to be verified.

In accordance with an embodiment, object oriented scripting tool can provide other useful features, just like the object oriented programming languages. These useful features include allowing method overriding and special "this" and "super" instance, like JAVA provides. Also, similar to JAVA, the object oriented Ant can support class extension and inheritance; reflection flavor of instance method invocation syntax, and syntax of getting instance property.

In accordance with an embodiment, the object oriented scripting tool can be used to build a software application. A generic application build scripts can be encapsulated into a class. A software developer can then create his or her own version of the generic application build scripts, in order to incorporate in some special feature he or she likes.

Figures 3, 4:
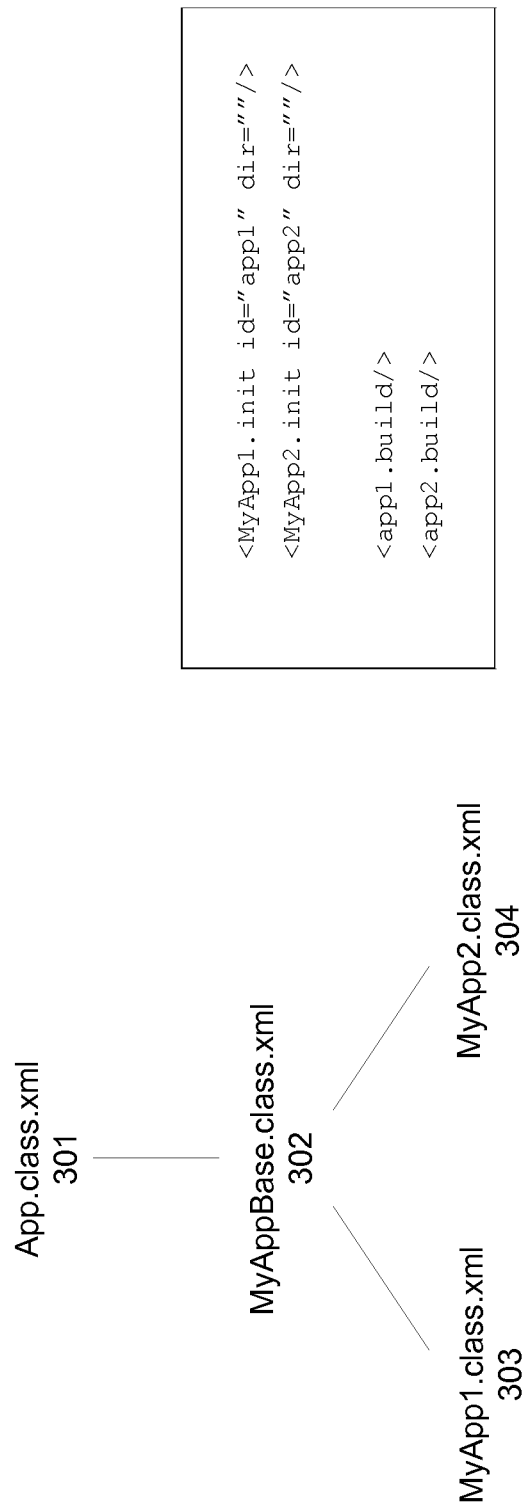
FIG. 3 is an illustration that shows an example of an objected oriented Ant class hierarchy for building software application, in accordance with an embodiment.
FIG. 4 is an illustration that shows a sample usage of object oriented Ant script classes for building application, in accordance with an embodiment.

FIG. 3 shows an example of a class hierarchy for building software application. As shown in FIG. 3, App.class.xml 301 is the base class that encapsulates generic application build scripts. MyAppBase.class.xml 302 is a class that inherits from the base class, App.class.xml 301. A software developer does not need to rewrite or copy and paste the implementation details already existing in App.class.xml 301. The software developer only needs to add new method or override an existing method in MyAppBase.class.xml 302.

Additionally, based on MyAppBase.class.xml 302, the software developer can create different object oriented Ant script classes, MyApp1.class.xml 303 and MyApp2.class.xml 304, for different projects. The different object oriented Ant script classes, MyApp1.class.xml 303 and MyApp2.class.xml 304, includes all necessary information in order to successfully compile and build a project, such as project directory and links to useful libraries.

FIG. 4 shows a sample usage of object oriented Ant script classes for building application. As shown in FIG. 4, two separate object oriented Ant script classes, MyApp1 and MyApp2 can be used to build two separate applications: app1 and app2.

In accordance with an embodiment, the object oriented scripting tool can also be used to manage different network or application server domains.

FIG. 5 shows an example of a class hierarchy for managing application server domains. As shown in FIG. 5, generic domain related scripts can be encapsulated into a class, Domain.class.xml 501. A network administrator can specify his or her own version of the generic domain related scripts in another class MyDomainBase.class.xml 502. MyDomainBase.class.xml 502 includes customized features that fit to the network administrator. Here, MyDomainBase.class.xml 502 is a class that inherits the base class, Domain.class.xml 501. In such a scenario, the network administrator does not need to rewrite or copy and paste the implementation details already existing in the generic domain management scripts. The software developer only needs to add new method or override an existing method for his or her own need.

Additionally, based on MyDomainBase.class.xml 502, the network administrator can create a separate object oriented Ant script classes, MyDomain1.class.xml 503, for a specific domain. Here, the object oriented Ant script class includes all necessary information in order to successfully prepare and start up the specific domain.

FIG. 6 shows a sample usage of object oriented Ant script classes for managing application server domains. As shown in FIG. 6, an application server domain, MyDomain1, can be prepared and start up using the object oriented Ant script class.

In accordance with an embodiment, the object oriented scripting tool can be used to make utility scripting class that can accept objects of other types of scripting classes as argument.

FIG. 7 a sample usage of an object oriented Ant utility class. As shown in FIG. 7, the utility Ant class, "MyApp1Util" class, has a reference or id, "app1util." The "MyApp1Util" class has a process method, which can obtain all instance properties of the "MyApp1" class by its reference or id, "app1." Further operations can be performed based on the obtained instance properties of the "MyApp1" class. Such operations include, but are not limited to, managing deployment descriptor files and so on.

In accordance with an embodiment, the object oriented scripting tool can be used for software application testing in a distributed environment, such as setting up a domain of application servers and linking to a database.

Figure 8:
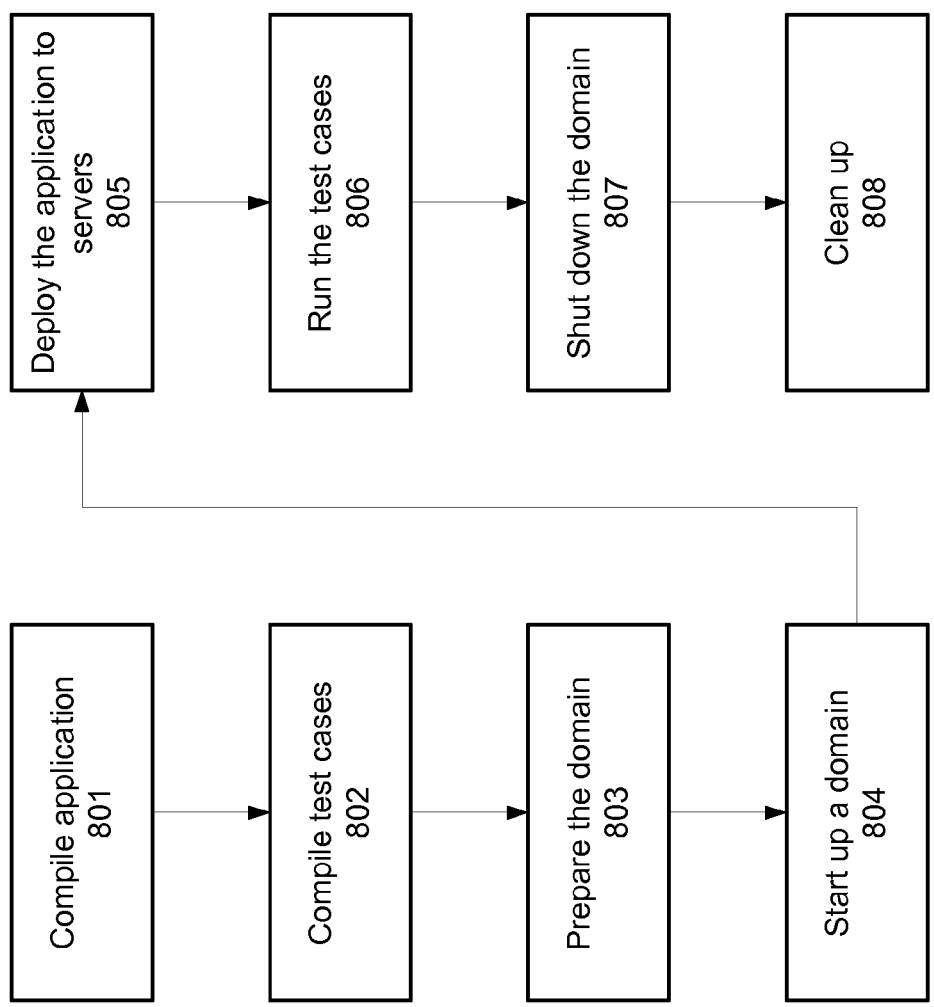
FIG. 8 is an illustration that shows the exemplary steps for testing software application in a distributed environment, in accordance with an embodiment.

FIG. 8 shows the exemplary steps for testing software application in a distributed environment. As shown in FIG. 8, the software application testing scripts can include the steps of first compiling the application 801, and developing and compiling different test cases of the application 802 for different purposes. Then, the target domain needs to be prepared 803 and started up 804, in order to be ready for the deployment of the application on the servers in the domain 805. After the test cases are done 806, the domain can be shut down 807 and ready for clean up 808.

Due to the complex nature of software testing, different test cases can be developed. There can be huge mount of script files for each testing scenario. The migration of the script files from one test case to another test case involves the usage of a lot of similar testing scripts, through a copy and paste approach, previously. The copy and paste approach is not efficient, since the testing scripts can be very large in size and involves a lot of details. Many times, the software developers are even willing to rewrite testing scripts without reusing the old testing scripts, in order to avoid mistakes. By using object oriented Ant, the software developer can easily extend from one test case to another test case without the need to copy and paste a huge amount of code.

In accordance with an embodiment, the introduction of object oriented syntax into Ant makes it much easier to reuse existing scripts. For example, an Ant macro "A" can internally invoke another macro "B." In one example, the software developer just wants to change the behavior of "B" and reuse "A". Using the copy and paste approach, the software developer needs to create two new macros: "A1" and "B1." the software developer needs to copy content of "A" into "A1" and change invoking of "B" into invoking of "B1." With the object oriented Ant, the software developer can simply extend the base class "B" with a new class "B1," which overrides one or more methods in "B" with new implementation.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented method to support an object-oriented scripting tool in a markup language environment, comprising:
    specifying, in a file, a software class in a scripting language using a first tag that is defined in the markup language environment, wherein the software class includes at least one method;
    referring to the at least one method in a second tag, wherein the second tag is not defined in the markup language environment;
    using a parser, running on one or more microprocessors, to parse the file;
    determining the second tag to be an unknown element in the markup language environment, when the parser reaches the second tag in the file;
    using the second tag as a key to obtain a type definition by checking with a type definition table; and
    invoking the at least one method.

2. The method according to claim 1, further comprising: allowing the scripting language to be Ant, and allowing the markup language environment to use a XML file.

3. The method according to claim 2, further comprising: using a XML parser to parse the XML file.

4. The method according to claim 1, further comprising: defining the at least one method using a method tag in the markup language environment.

5. The method according to claim 1, further comprising: using an instance of tag in the markup language environment to check whether a software object is an instance of the software class.

6. The method according to claim 1, further comprising: supporting at least one of:
    class extension and inheritance,
    method overriding,
    instance polymorphism, and
    reflection.

7. The method according to claim 1, further comprising: supporting a syntax for instance method invocation in the second tag, wherein the syntax includes a class reference and a method name.

8. The method according to claim 1, further comprising: using a type definition table to define the syntax for instance method invocation.

9. The method according to claim 1, further comprising:
encapsulating a generic application build scripts into the software class, and
executing special application build scripts in another software class, wherein the another software class is extended or inherited from the software class.

10. The method according to claim 1, further comprising:
encapsulating a generic domain management scripts into the software class, and
starting up a special domain using domain management scripts in another software class, wherein the another software class is extended or inherited from the software class.

11. The method according to claim 1, further comprising:
allowing the software class to be a utility class that can accept an instance of another software class as an argument.

12. The method according to claim 1, further comprising:
using the object-oriented scripting tool to link to a database.

13. The method according to claim 7, further comprising:
using the object-oriented scripting tool to deploy an application to different servers.

14. The method according to claim 1, further comprising:
using a class initiation tag in the markup language environment to assign a reference value to the software class.

15. The method according to claim 1, further comprising:
using an echo tag in the markup language environment to write out content of a message.

16. A system to support an object-oriented scripting tool in a markup language environment, comprising:
one or more microprocessors;
a parser, running on the one or more microprocessors, that operates to parse a document that is capable of specifying, in a file, a software class in a scripting language using a first tag that is defined in the markup language environment, wherein the software class includes at least one method;
referring to the at least one method in a second tag, wherein the second tag is not defined in the markup language environment;
using the parser to parse the file;
determining the second tag to be an unknown element in the markup language environment, when the parser reaches the second tag in the file;
using the second tag as a key to obtain a type definition by checking with a type definition table; and
invoking the at least one method.

17. A non-transitory machine readable medium having instructions stored thereon that when executed cause a system to perform the steps comprising:
specifying, in a file, a software class in a scripting language using a first tag that is defined in the markup language environment, wherein the software class includes at least one method;
referring to the at least one method in a second tag, wherein the second tag is not defined in the markup language environment;
using a parser, running on one or more microprocessors, to parse the file;
determining the second tag to be an unknown element in the markup language environment, when the parser reaches the second tag in the file;
using the second tag as a key to obtain a type definition by checking with a type definition table; and
invoking the at least one method.

* * * * *

UNITED STATES PATENT AND TRADEMARK OFFICE
CERTIFICATE OF CORRECTION

PATENT NO. : 8,504,987 B2
APPLICATION NO. : 12/860667
DATED : August 6, 2013
INVENTOR(S) : Li et al.

It is certified that error appears in the above-identified patent and that said Letters Patent is hereby corrected as shown below:

In the Specification

In column 3, line 57, delete "that that includes" and insert -- that includes --, therefor.

Signed and Sealed this
Nineteenth Day of November, 2013

Teresa Stanek Rea
*Deputy Director of the United States Patent and Trademark Office*